United States Patent
Rane et al.

(10) Patent No.: US 8,495,379 B2
(45) Date of Patent: Jul. 23, 2013

(54) METHOD AND SYSTEM FOR MANAGING A HIERARCHY OF PASSWORDS

(75) Inventors: Shantanu Rane, Cambridge, MA (US); Yige Wang, Natick, MA (US); Jonathan S. Yedidia, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1219 days.

(21) Appl. No.: 12/357,801

(22) Filed: Jan. 22, 2009

(65) Prior Publication Data
US 2010/0185870 A1    Jul. 22, 2010

(51) Int. Cl.
*G06F 21/00* (2013.01)

(52) U.S. Cl.
USPC .............................. 713/184; 380/44; 726/16

(58) Field of Classification Search
None
See application file for complete search history.

(56) References Cited

U.S. PATENT DOCUMENTS

| | | | | |
|---|---|---|---|---|
| 5,751,812 | A * | 5/1998 | Anderson | 713/155 |
| 7,272,231 | B2 * | 9/2007 | Jonas et al. | 380/281 |
| 2002/0029341 | A1 * | 3/2002 | Juels et al. | 713/184 |
| 2003/0101138 | A1 * | 5/2003 | Matsuzaki | 705/44 |
| 2006/0210082 | A1 * | 9/2006 | Devadas et al. | 380/277 |
| 2006/0288231 | A1 * | 12/2006 | Kim et al. | 713/184 |

* cited by examiner

*Primary Examiner* — Nadia Khoshnoodi
(74) *Attorney, Agent, or Firm* — Dirk Brinkman; Gene Vinokur

(57) ABSTRACT

A method and system manage a hierarchy of passwords for users accessing a hierarchy of access control devices. First, a codeword is acquired and a syndrome of the codeword is determined. Next, the codeword is randomly modified with a probability p to produce a modified codeword. The modified codeword is selected and assigned to a user as a password, if the modified codeword is recoverable.

13 Claims, 7 Drawing Sheets

100

300

700

METHOD AND SYSTEM FOR MANAGING A HIERARCHY OF PASSWORDS

FIELD OF THE INVENTION

This invention relates generally to a method for generating passwords, and more particularly to a method for generating passwords for a hierarchy of users.

BACKGROUND OF THE INVENTION

There is a need to deny unauthorized access to vulnerable electronic information. Computing and communications systems appear in every sector of the economy, and increasingly in homes and other locations. As the availability and use of computer based systems grow, so do their interconnections. The result is a shared infrastructure of information, computing, and communications. The nature of shared infrastructures creates vulnerabilities for users. In general, easier access for users implies easier access by unauthorized users. Cryptography plays an important role in addressing certain types of information vulnerability.

Conventional cryptography protects data by using a cryptographic process and a secret key. Encryption transforms plaintext into ciphertext using the key. Different keys results in a creation of different ciphertext. Decryption transforms the ciphertext back to the plaintext. When the encryption and decryption operations use the same key, the method is known as symmetric key cryptography. In asymmetric key cryptography, the encryption and decryption keys are different. Usually, one of these keys is made publicly available while the other key is privately maintained by an authorized party. A password assigned to a user of a system may be considered as a private key that enables this user to access certain capabilities of the system. Methods for generating keys and passwords and distributing the keys and passwords are included under the broad designation of "key management."

It is often necessary to implement access control schemes in which the decision to grant or deny access to data depends on the position of a user in a hierarchy of classes. For example, users are partitioned into three classes: A, B and C. Class A has the highest privileges and class C has the lowest privileges. Accordingly, the highest security device only allows access to users of class A. The medium security device allows access to users in classes A and B, while the low security device allows access to all users. This architecture can be extended to more than three classes, which are arranged in one of many possible hierarchies, so that the privileges of the class depend on its position in the hierarchy. There can be multiple users within a certain privilege class.

Such hierarchies arise in numerous practical access control applications. For example, in an industrial plant, certain areas may be off-limits to machine shop workers and accessible only to qualified supervisors. In another example, customer service personnel of a bank may have access to public information of a customer, while their managers can access more classified details. A hierarchical password scheme is defined as a method that generates keys or passwords for each user depending upon the position of the user in the hierarchy, i.e., depending upon the privilege class of the user.

Key or password management is important in a security system. Key management includes generation, distribution, and termination of keys. Furthermore, many applications require a hierarchical access structure in which subsets of users have different access privileges.

A number of different structures for generating hierarchy of passwords are known. However, there are several important issues that remain unaddressed. The first issue is that the security system can be networked, i.e., all access control devices are connected to a central administrative device so the operations of adding a new user or revoking a user can be conveniently performed over network connection. If networking is not available or not possible, then it is cumbersome to manually modify the user information that is stored in the database of an access control device. The second issue is that in most conventional password schemes, each access control device stores different authentication information, e.g., cryptographic hashes or keys for all users that are allowed to legally access that device. This may not be efficient in terms of memory requirements.

It is desirable to provide a method that can generate passwords while reducing or completely eliminating the necessity to update access control devices in a security system.

SUMMARY OF THE INVENTION

It is an object of the invention to provide a method for generating passwords for a hierarchy of users.

It is a further object of the invention to provide a method that eliminates the necessity to update an access control device when the hierarchy of users is updated.

It is a further object of the invention to provide a method that is suitable for enabling the authentication of a large number of users using a single cryptographic hash and helper information at the access control device.

The invention is based on the realization that a recoverable randomly modified codeword can be used as a password.

Embodiments of the invention provide a method for generating passwords for an arbitrary hierarchy of users. The authentication process is based on error correcting codes (ECC), which allow multiple passwords to be authenticated using a single cryptographic and a single syndrome of the ECC.

In addition to reducing the storage requirements, the method also makes it possible to enroll new users without updating the information stored on the access control device. Given only the stored information, it is difficult for an attacker to guess the password of any user. Furthermore, digital signatures are used to ensure that legitimate users do not manipulate their passwords in order to impersonate other users. The method also allows the system administrator to revoke a subset of passwords, which may have been compromised.

DETAILED DESCRIPTION OF THE PREFERRED EMBODIMENT

Figure 1:
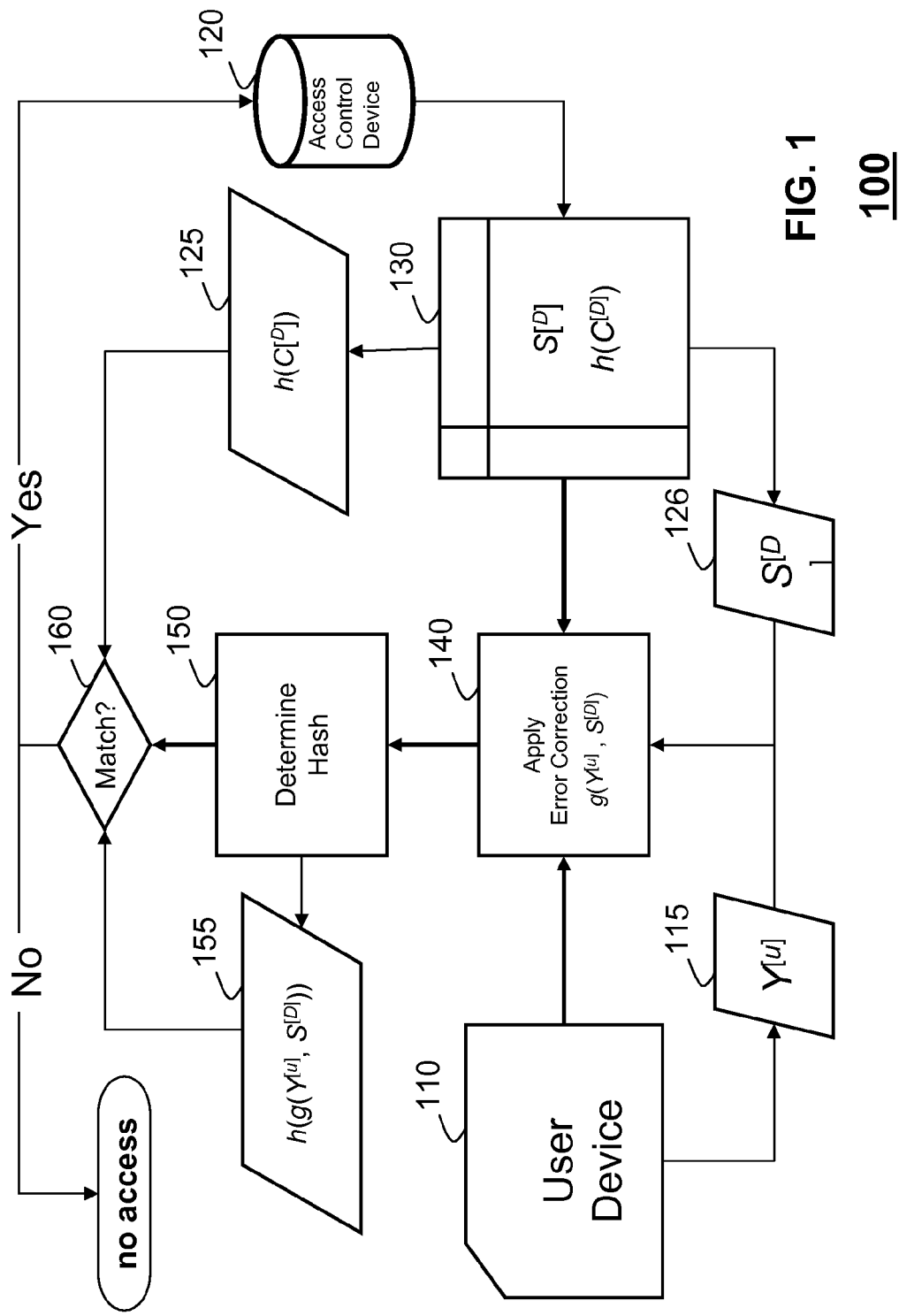
FIG. 1 is a flow chart of a method and a system for password authentication using security information generated according to embodiments of the invention.

FIG. 1 shows a method and system 100 for password authentication using security information generated according to embodiments of our invention. Authentication information for user u, e.g., a password $Y^{[u]}$ 115, is stored on a user device 110. The password is used to access an access control device D 120. A smart card is an example of the user device 110. Other devices include mobile terminals, handheld processors, and the like.

The access control device 120 is any resource that requires protection from unauthorized access, e.g., a door to a secured room, privileges to access a database or a document.

The access to the access control device 120 is protected with a codeword, e.g., a binary codeword $C^{[D]} \in \Re^{1 \times N}$ of length N. However, the codeword does not have to be stored at the device 120. Instead, in one embodiment of the invention, only a cryptographic hash $h(C^{[D]})$ 125 of the codeword $C^{[D]}$, and a linear error correction code (ECC) or syndrome $S^{[D]}$ 126 are stored in a memory 130 associated with the access control device 120. The ECC can be represented by a parity check matrix H 670, see FIG. 6. The parity check matrix is a matrix of zeros and ones, with K rows and N columns. The N columns of the parity check matrix correspond to the N symbols of the ECC, and K represents the number of constraints the ECC must satisfy.

The parity check matrix can be used to form a system of K equations and N unknowns. The binary parity check matrix is $H \in \Re^{K \times N}$, where K<N, to calculate the syndrome using the relation $S^{[D]}=C^{[D]}H^T$, where H represents the transpose of the matrix H. For example, if K=3, N=7, then a possible parity check matrix is:

$$H = \begin{bmatrix} 1 & 1 & 1 & 0 & 1 & 0 & 0 \\ 1 & 1 & 0 & 1 & 0 & 1 & 0 \\ 1 & 0 & 1 & 1 & 0 & 0 & 1 \end{bmatrix}.$$

Assuming $C^{[D]}=[1\ 0\ 1\ 1\ 0\ 0\ 0]$, then $$S^{[D]} = C^{[D]}H^T$$

$$= [1\ 0\ 1\ 1\ 0\ 0\ 0] \cdot \begin{bmatrix} 1 & 1 & 1 \\ 1 & 1 & 0 \\ 1 & 0 & 1 \\ 0 & 1 & 1 \\ 1 & 0 & 0 \\ 0 & 1 & 0 \\ 0 & 0 & 1 \end{bmatrix}$$

$$= [0\ 0\ 1].$$

Because K<N, the system of equations in underdetermined, i.e., knowing only the syndrome $S^{[D]}$, it is impossible to determine the codeword $C^{[D]}$.

The password authentication method 100 determines 150 a hash 155 of a candidate codeword produced by an error correction function $g(Y^{[u]}, S^{[D]})$ 140 for the password $Y^{[u]}$ 115 using the syndrome $S^{[D]}$ 126. This means that the method determines the candidate codeword using both the stored syndrome $S^{[D]}$ and the password $Y^{[u]}$. Access to the access control device 120 is granted if the hash 155 of the candidate codeword matches 160 with the hash 125 stored at the device 120. In one embodiment, we determine the candidate codeword, by a belief propagation decoding method. However, any other error correction decoding technique can be used.

Error Correction Code for Password Generation

Let $U_1, U_2, \ldots, U_T$ be users requiring access to a device D. In conventional cryptography-based password schemes, the system administrator assigns a password to each user and stores the cryptographic hash of that password on an access control device. Thus, T users require storage of T hashes. Further, if a new user is to be added, then a new hash must be stored on the device.

Embodiments of our invention provide a method in which T users are assigned different passwords 115, all of which can be authenticated using the single syndrome $S^{[D]}$ 126, i.e., an error indicator, calculated from an appropriate ECC.

Figure 2A:
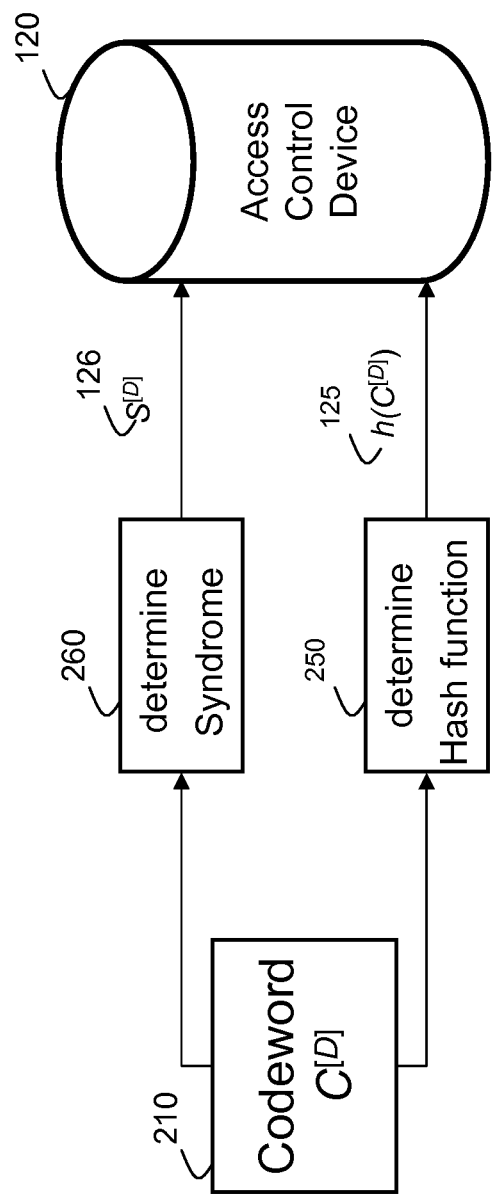
FIGS. 2A-B are block diagrams of a method for computing authentication information according to embodiments of the invention.
Figure 2B:
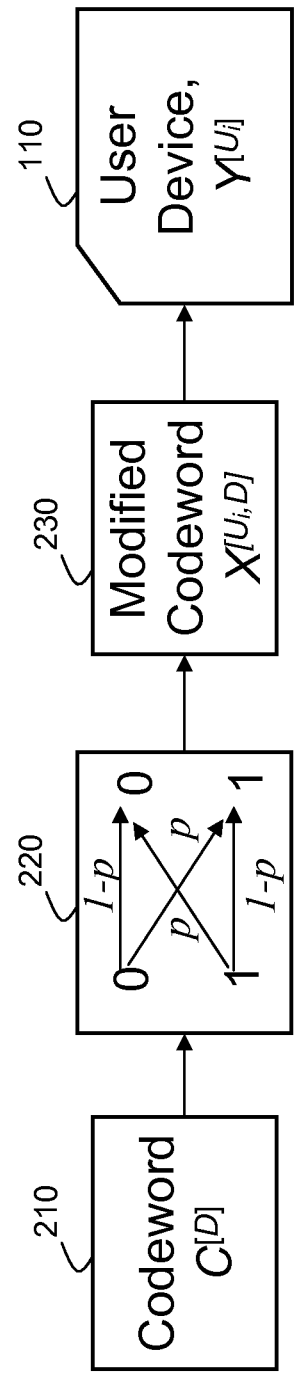

FIGS. 2A-B are block diagrams of a method for computing security information according to embodiments of our invention. FIG. 2A shows how to determine the security information, namely the syndrome 126 and the hash 125 to be stored on the access control device. FIG. 2B shows how to determine the security information, namely the password 110 to be stored with on the user device 110.

For the access control device D 120, we generate a binary codeword of length N, $C^{[D]}$ 210. The bits of the codeword $C^{[D]}$ are independent and identically distributed (i.i.d.) Bernoulli numbers, wherein each bit is 0 or 1 with equal probability b, i.e., b=0.5. Thus, knowing the value of any one bit is not helpful in estimating the values of any other bits. Bernoulli number X with parameter b means X is either 0 or 1, and the number is 1 with probability of b. The cryptographic hash $h(C^{[D]})$ 125 of the codeword $C^{[D]}$ 210 is determined 250 and stored at the access control device 120.

This hash can be determined using any conventional cryptographic technique such as MD5, SHA-1, SHA-2, wherein MD5, i.e., Message-Digest Algorithm 5, and SHA, i.e., Secure Hash Algorithm, are examples of well known cryptographic hash functions. Furthermore, our ECC uses the binary parity check matrix H to determine 260 the syndrome $S^{[D]}$ 126, such that $S^{[D]}=C^{[D]}H^T$. The syndrome $S^{[D]}$ 126 is also stored at the access control device 120.

The embodiments of the invention are based on the realization that recoverable randomly modified codeword can be used as a password of a user. In order to find a password for any user $U_i$, i=1, 2, . . . , T, we modify the codeword randomly by passing 220 the codeword $C^{[D]}$ 210 through a binary symmetric channel (BSC) with cross-over probability p, as shown in FIG. 2B. We denote the BSC with cross-over probability p by "BSC-p." This process randomly inverts bits of the codeword $C^{[D]}$ 210 with probability p to produce a modified codeword $X^{[U_i,D]}$ 230. The probability p of the bit inversion is selected, such that it is always possible to recover the codeword $C^{[D]}$ from $X^{[U_i,D]}$, given the syndrome $S^{[D]}$ i.e., $$g(X^{[U_i,D]}, S^{[D]})=C^{[D]}, \qquad (1)$$

where the function g can be any decoding method for error correcting codes, for example, belief propagation decoding.

We select the modified codeword $X^{[U_i,D]}$ as the password $Y^{[U_i]}$ 115 for the user $U_i$, if the modified codeword is recoverable, and assign the password to the user device 110. As described above, in one embodiment we select the modified codeword as recoverable, if a result of an execution of an error correction function having as an input the modified codeword and the syndrome equals to the codeword. If the modified codeword is not recoverable, we repeat the modifying and selecting steps of the method.

Now, different users $U_i$ can be assigned different passwords based on different realizations of the BSC-p. The system administrator can verify that instances of the BSC are different and can also verify that Equation (1) holds for all $U_i$. If the relation does not hold for some $U_i$, then it is a simple matter to generate another realization of the BSC-p for which the relation does hold.

Different realizations of the BSC-p ensure that different users are assigned different passwords. Verifying Equation (1) guarantees that legitimate users can access the system. Because $X^{[Ui,D]}$ is a modified codeword, $X^{[Ui,D]}$ cannot always be decoded to $C^{[D]}$, i.e., the modified codeword does not satisfy Equation (1). In this case, we keep generating $X^{[Ui,D]}$ until Equation (1) is satisfied, and then assign the last $X^{[Ui,D]}$ as the password.

Note that the codeword $C^{[D]}$ does not have to be stored on the user device, only the cryptographic hash $h(C^{[D]})$ needs to be stored. Cryptographic hash functions are assumed to be computationally secure, i.e., it is extremely difficult to estimate the value of $C^{[D]}$ from the value of the stored hash. To perform authentication, as shown in FIG. 1, a user u inputs a password $Y^{[u]}$ and access is granted if and only if $$h(g(Y^{[u]}, S^{[D]})) = h(C^{[D]}). \quad (2)$$

Embodiments of our invention construct an access control system for T users, using one syndrome $S^{[D]}$, and one cryptographic hash. Additionally, if the size N of the codeword $C^{[D]}$ is large enough, then adding new users is trivial. The administrator only has to generate a new realization of the BSC-p, and obtain $X^{[UT+1,D]}$ as describe above.

Method of Generating a Hierarchy of Passwords

The method of authenticating multiple users with only one hash and one syndrome is used as a building block in the hierarchical password assignment method according to embodiments of the invention. To facilitate this description, we use a four-level hierarchy of users. Our invention generalizes to an arbitrary number of levels and an arbitrary number of users per level, provided the size N of the codeword is sufficiently large. The invention also generalizes to an arbitrary branching hierarchy, much more complicated than shown in FIG. 3.

Figure 3:
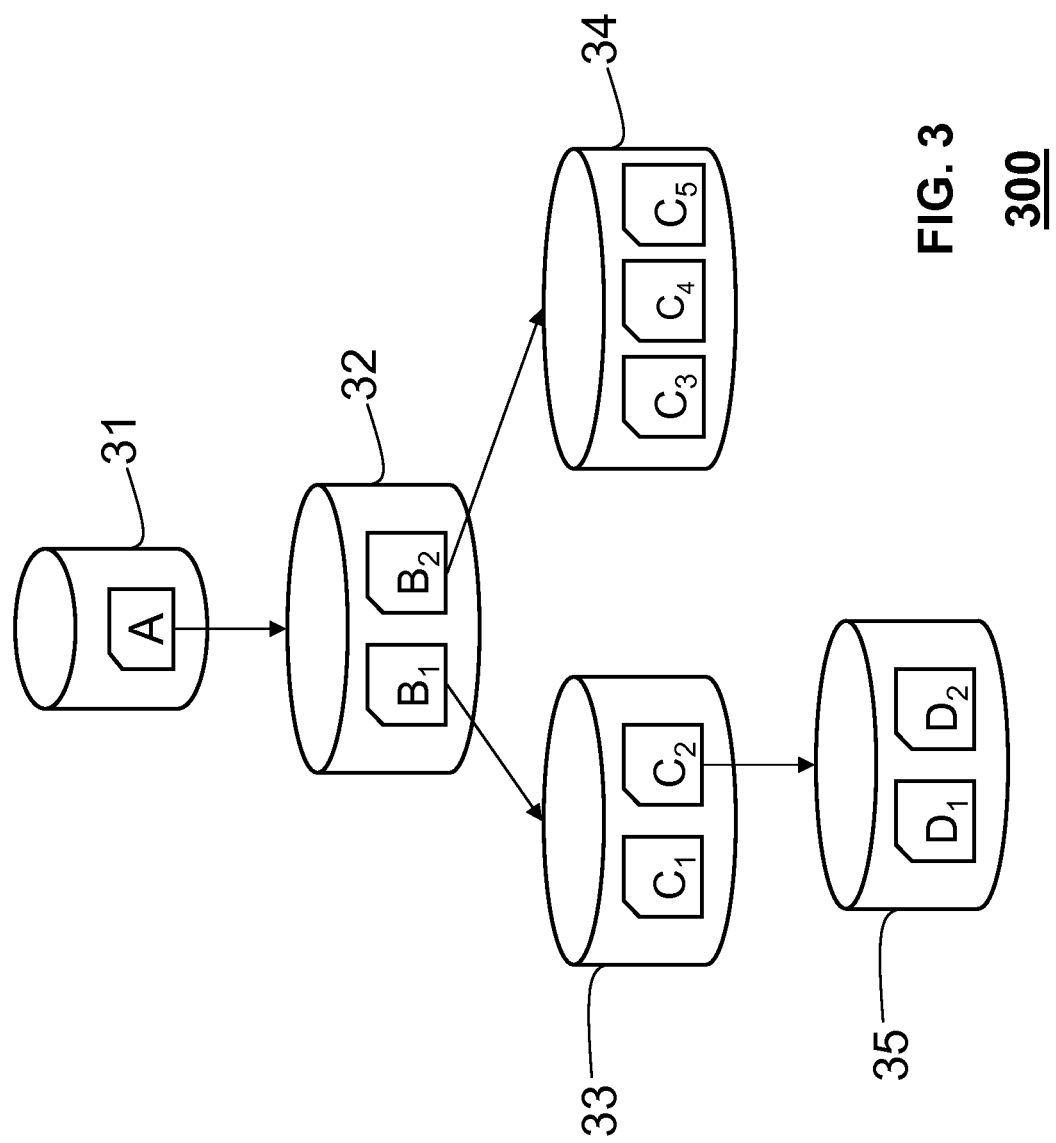
FIG. 3 is a diagram of an example of a hierarchy of users and access control devices according to embodiments of the invention.

FIG. 3 shows a hierarchy 300 of users and access control devices according to embodiments of our invention. The hierarchy is in the form of a tree with one root node, and descendent nodes. The hierarchy 300 includes devices 31, 32, 33, 34, and 35. The hierarchy 300 also identifies users: A, $B_1$, $B_2$, $C_1$, $C_2$, $C_3$, $C_4$, $C_5$, $D_1$ and $D_2$. The objectives of our embodiments are to assign passwords to each of these users.

Notations and Definitions

For the purpose of this description, the passwords of all of the users in the hierarchy 300 are assigned according to following rules.

A user who is closer to the root node of the tree is superior to a user further from the root node. If multiple inferior users are connected to a single superior user, then the superior user is called an ancestor, and the multiple inferior users are called descendants. For example, referring to FIG. 3, user $B_1$ is the ancestor to users $C_1$, $C_2$, $D_1$ and $D_2$ and users $C_1$, $C_2$, $D_1$ and $D_2$ are all descendants of user $B_1$.

If a user can access a given device, then all ancestors are also able to access that device with their respective passwords. For example, still referring to FIG. 3, because device 35 can be accessed by user $D_1$ and user $D_2$, and therefore device $D_1$ can also be accessed by user $C_2$ and user $B_1$, but not by user $C_1$.

The highest security device D to which a user u has access is the device associated with the closest node. Accordingly, the other devices to which the user u has access are lower security devices. For instance, in FIG. 3, device 32 is the highest security device for user $B_2$, while device 34 is the highest security device for user $C_5$. A password for the user u, assigned to the highest security device, facilitates access to all other lower security devices.

If the user u can access the highest security device D, then descendants of the user cannot access that device using only the assigned password. For example, device 33 is the highest security device for user $C_2$, therefore user $D_1$ and user $D_2$ cannot access the device 33.

A password assigned to the user u is denoted by $X^{[u,D]}$, where D is the highest security device for the user. For example, the password assigned to user $B_2$ is $X^{[B2,32]}$. As described above, this password is a binary string of length N. Further, according to the rules defined herein, this password suffices for all other devices for which user $B_2$ is the ancestor.

All users who are able to access a particular device are called colleagues. For example, in FIG. 3, user $C_1$ and user $C_2$ are colleagues. Colleagues can have the same or different ancestors. Colleagues can have same or different descendents.

Password Generation

Figure 4:
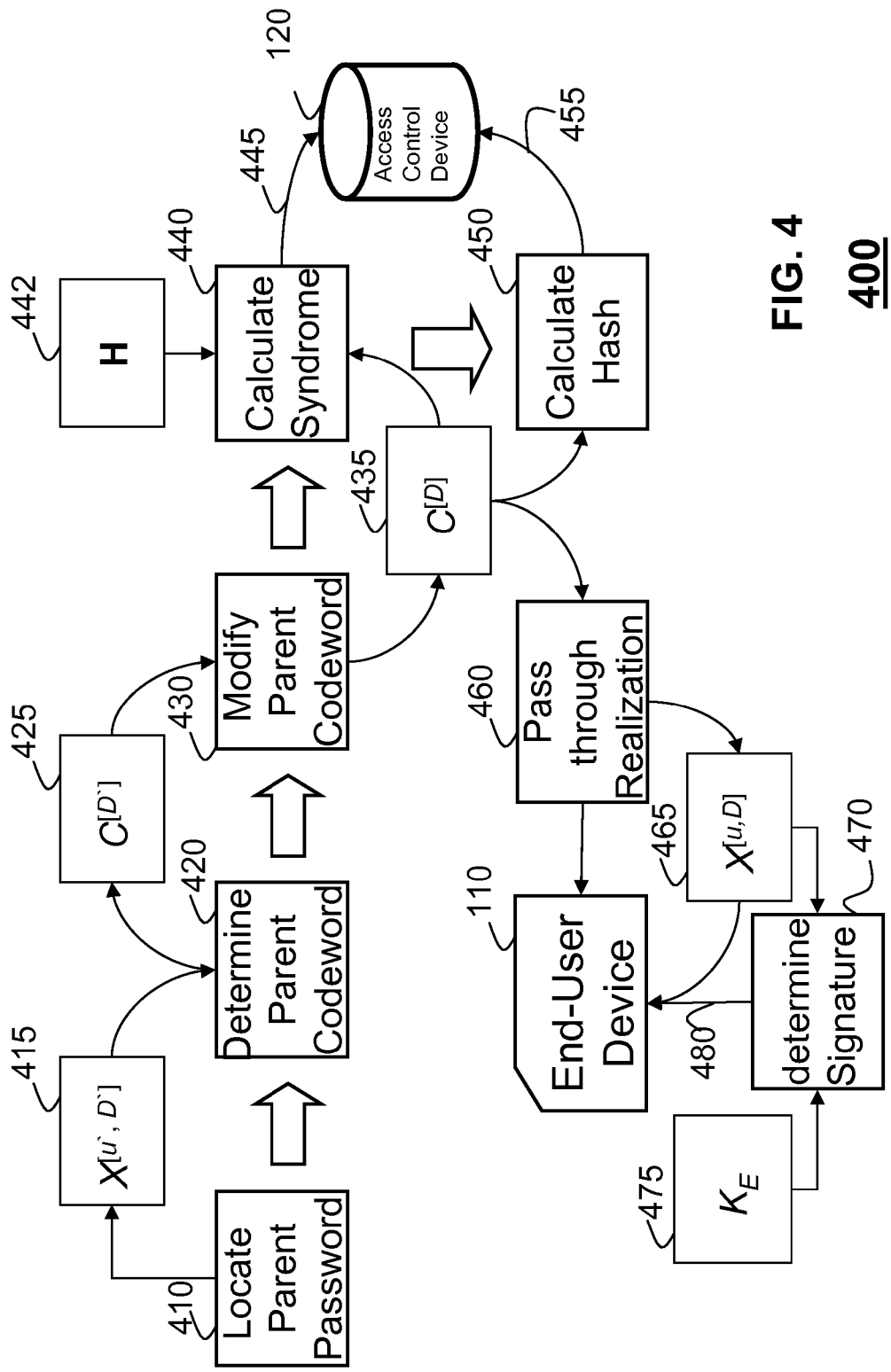
FIG. 4 is a block diagram of a method for generating and assigning a password according to embodiments of the invention.

FIG. 4 shows the method for generating and assigning a password according to embodiments of our invention. A password $Y^{[u]}$ or $X^{[u,D]}$ for user u is generated using the following steps, typically performed under the control of the system administrator.

First, the administrator locates 410 a "parent" or the nearest ancestor of the user u. For example, referring to FIG. 3, the parent of the user $D_1$ is the user $C_2$, the parent of the user $C_2$ is the user $B_1$, the parent of the user $B_1$ is the user A and the parent of the user A is a binary codeword of length N, $C^{[D]}$ $\in R^{1 \times N}$ with i.i.d. Bernoulli entries, b=0.5. The parent of user u is denoted by u', and the security device by D'. Thus, the password 415 of the parent is $X^{[u',D']}$.

For the parent's device, D', the administrator uses the syndrome $S^{[D']}$ to determine 420 the codeword $C^{[D']}$ 425, i.e., $C^{[D']} = g(X^{[u',D']}, S^{[D']})$, according to the Equation (1).

Then, the administrator modifies 430 the codeword of the parent by passing the bits of the codeword $C^{[D']}$ 425 through the binary symmetric channel with some inversion probability q, e.g., 0.5. The modified version of $C^{[D']}$ is denoted by $C^{[D']}$ 435. Typically, a pseudorandom number generator is used to simulate the BSC-q channel, i.e., to randomly invert bits of $C^{[D']}$ with the probability q. The seed of the pseudorandom number generator has previously been assigned to the parent user u' to enable access to any lower security devices. Note that this seed is not stored on the device or provided to the user u. This increases the difficulty of attacks on device D by unauthorized colleagues of the parent u'.

For the predetermined ECC with a parity check matrix H 442, we calculate 440 the syndrome $S^{[D]} = C^{[D]} H^T$ 445. The syndrome 445 is stored on the access control device D 120. This single syndrome is used to authenticate all users who are allowed to access this device.

Further, as described above, we determine 450 $h(C^{[D]})$, the cryptographic hash 455 of $C^{[D]}$, and store the hash at the device 120. Typically, we do not store $C^{[D]}$ on the device 120 directly.

As described above referring to FIG. 2B, we pass 460 the codeword $C^{[D]}$ 435 through one realization of the BSC-p to generate $X^{[u,D]}$ 465. We assign $X^{[u,D]}$ 465 as the password $Y^{[u]}$ for the user u, and typically store the password on the user device 110.

In some embodiments of our invention, given the password $X^{[u,D]}$ 465 and a system administrator's private key 475 $K_E$, we determine 470 a digital signature 480 $Z^{[u]}=V(X^{[u,D]}, K_E)$. The signature $Z^{[u]}$ 480 is also assigned to the user u and stored on the user device 110. In order to gain access, the user must provide both his password $X^{[u,D]}$ 465 as well as the digital signature $Z^{[u]}$ 480 to protect the system against insider attacks.

Figure 5:
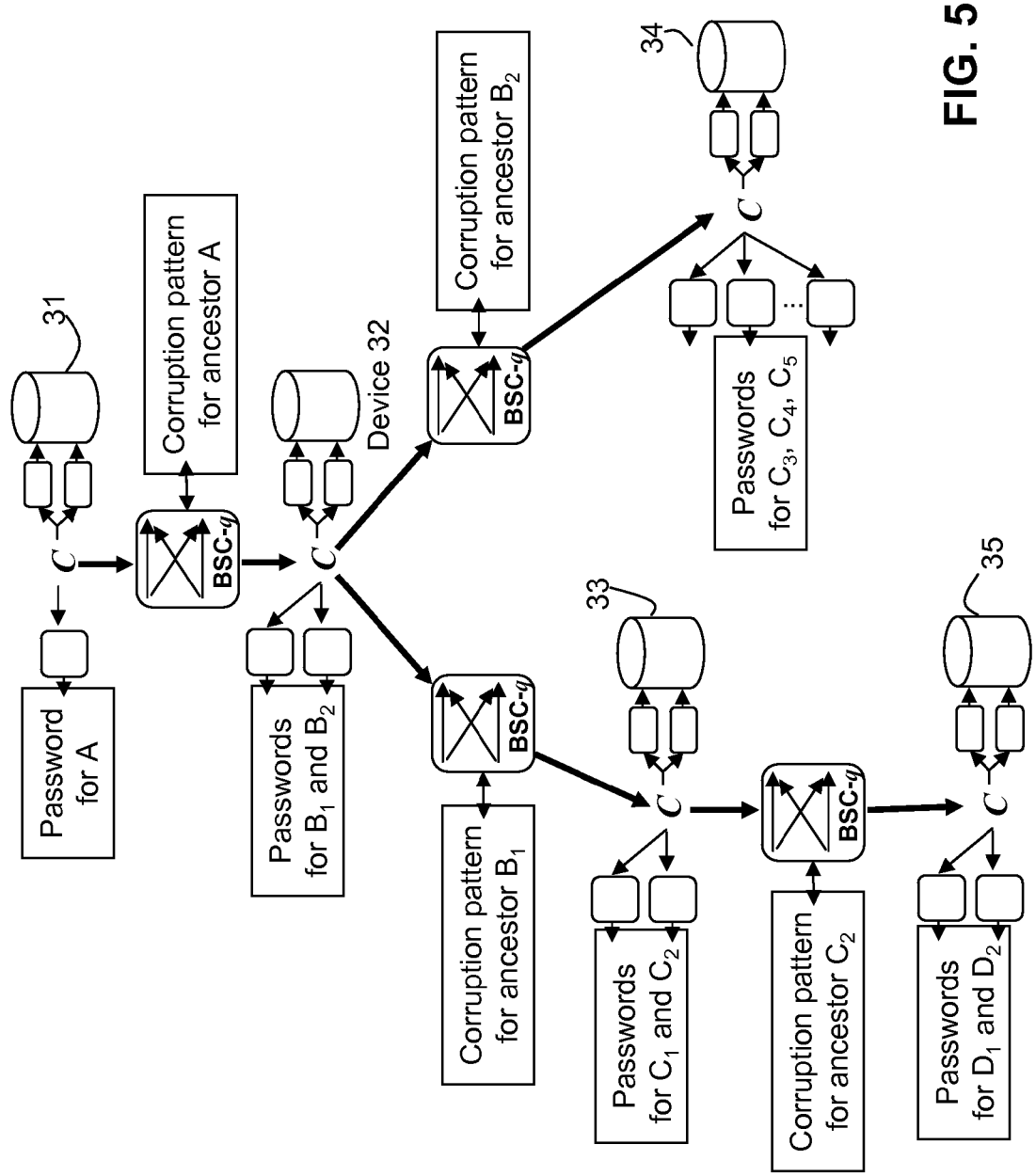
FIG. 5 is an example flow chart of the method of FIG. 4 for the example hierarchy shown in FIG. 3 according to embodiments of the invention.

FIG. 5 shows a method 400 in hierarchical form. Each individual operational unit is a replica of the single stage password assignment described referring to FIG. 2. For simplicity, the final step of the password assignment process, i.e., the calculation of the digital signature, is not shown.

Authentication Information Stored on User and Access Control Device

Figure 6:
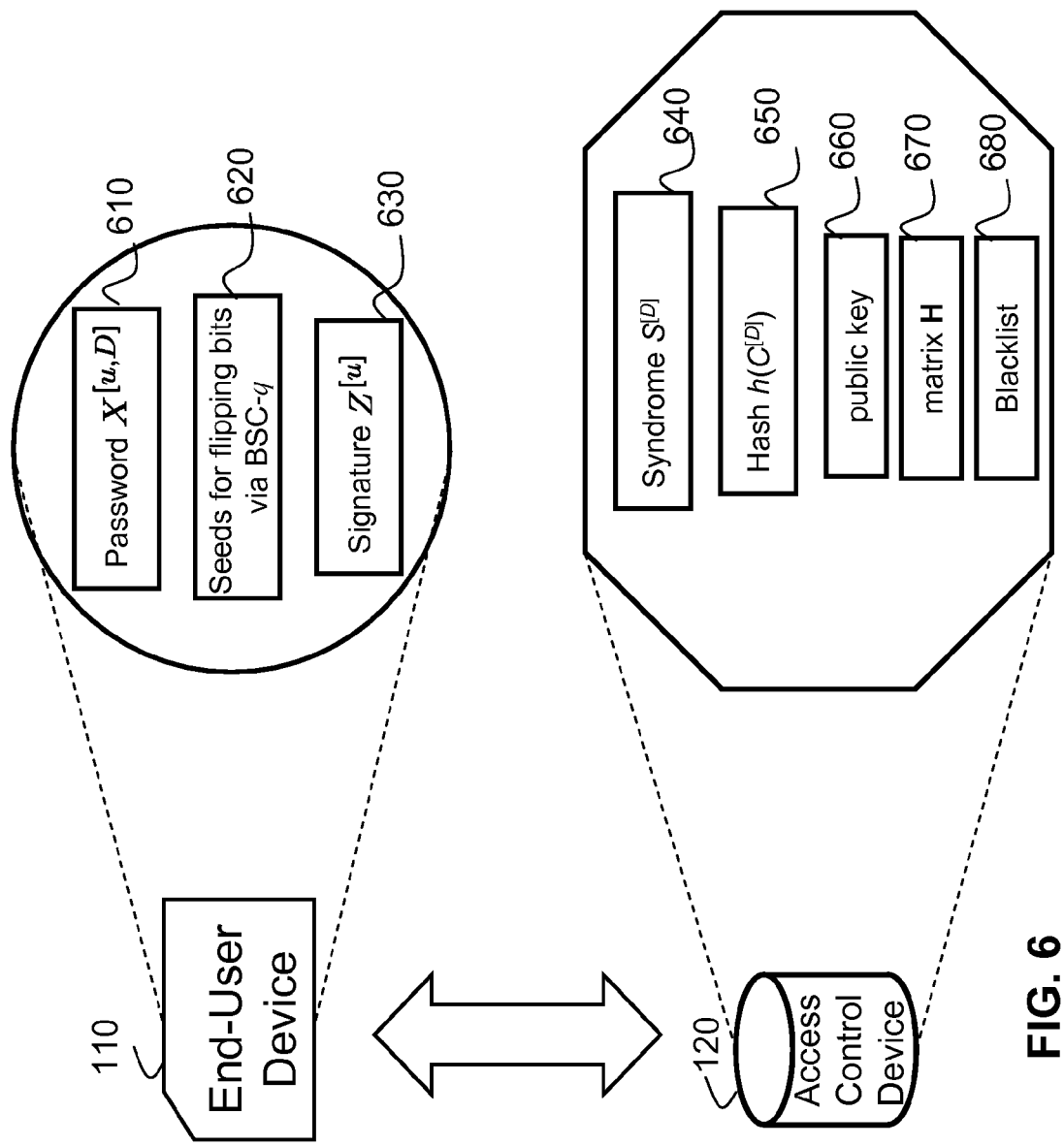
FIG. 6 is a schematic of authentication information stored with the user and on the access control device according to embodiments of the invention.

FIG. 6 shows example authentication information stored on the user and the access control device according to embodiments of our invention, to enable users to access all permissible access control devices of the hierarchy, e.g., the hierarchy 300.

In our embodiments, the user device 110 has access to the password $X^{[u,D]}$ 610, where D denotes the highest security device that the user u is allowed to access. This password $X^{[u,D]}$ 610 enables the user u to access the devices assigned to all descendants. The digital signature $Z^{[u]}$ 630 is also stored on the device 110, which enables the access control device to check the integrity of the password. This is the first line of defense against insider attacks by legitimate users trying to gain access by generating new passwords without the knowledge of the administrator.

The seeds 620 are used by the pseudorandom number generators to perform a modification of a codeword operation as described in greater details below. If a user has access to device D and l other lower security devices, then l seeds are stored, one to perform the modification operation for each lower level device. The modification operation increases the difficulty of accessing a password of an ancestor.

The authentication information stored on the access control device 120 enables the device to verify the authenticity of a password provided by the user device 110. For a device D, the process of authentication involves verifying whether the codeword $C^{[d]}$ can be recovered from the input password Y given the syndrome $S^{[D]}$. For security however, it is not desirable to store the codeword $C^{[D]}$ directly on the device 120, because if a malicious attacker, gains access to $C^{[D]}$, the attacker can trivially self authenticate by using the input password $Y=C^{[D]}$.

In some embodiments of our invention, the access control device 120 has access to the parity check matrix of the error correcting code, H 670, the syndrome $S^{[D]}$ 640, and the cryptographic hash of $C^{[D]}$, denoted by $h(C^{[D]})$ 650. Furthermore, a public key $K_D$ 660, which is used to check the integrity of the password provided by the user, is also stored at the device 120. Recall that the user must input the password $X^{[u,D]}$, as well as the signature $Z^{[u]}$. During an insider attack, a legitimate user u can suppress an identity by inverting a few bits in a password to generate a new password $Y^{[u]}$. To prevent this, the public key $K_D$ is used to check whether $Y^{[u]}$ is consistent with the signature $Z^{[u]}$.

Method of Authenticating Passwords

In one embodiment of our invention, when the user u accesses the highest security device D using password $Y^{[u]}$ and the signature $Z^{[u]}$, the authentication process operates as follows. The device uses the public key $K_D$ 660 of system administrator to verify whether the password $Y^{[u]}$, i.e., $X^{[u,D]}$ 610, is consistent with the digital signature $Z^{[u]}$ 630. If false, then the access is denied. If true, the device verifies if the equality of the Equation (2) is satisfied. If false, access is denied. If true, access is granted. This final step is similar to the method 100 shown in FIG. 1.

Figure 7:
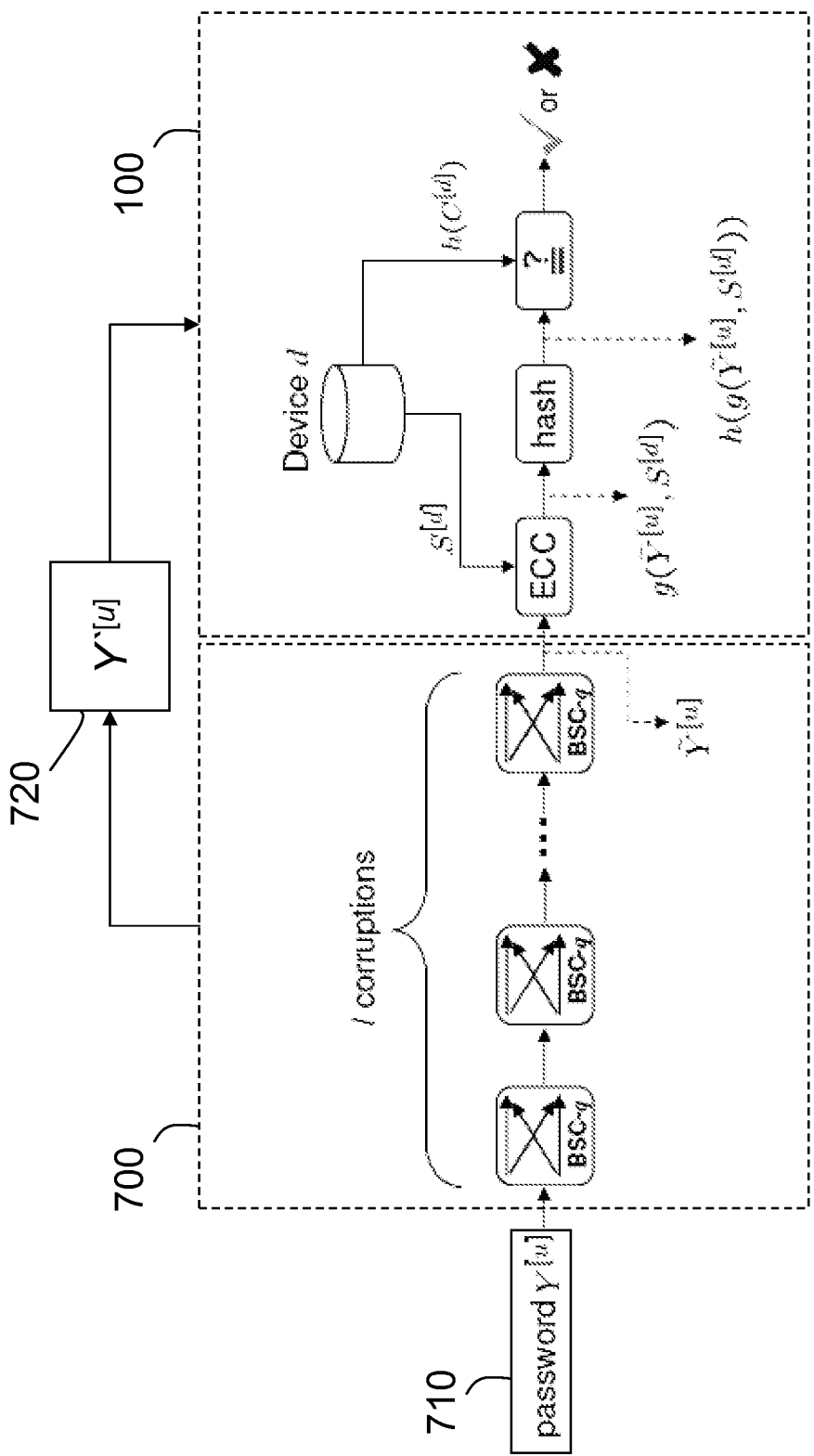
FIG. 7 is a block diagram of a method for password authentication according to embodiments of the invention.

FIG. 7 shows password authentication at lower-level devices for which the user u is the parent. For example, user $B_1$ needs to access device 33, see FIG. 3. We analyze a general situation in which the lower security device is l levels below the device highest security device D. This means that the user device used to input the password stores at least l seeds for modifying the password of the user. In one embodiment, each seed is an integer generated by the pseudorandom number generator.

To determine the password $Y'^{[u]}$, which enables a legitimate user, e.g., a parent user, to access l lower-level devices, i.e., an l-level access control device, we modify the password $Y^{[u]}$ 710 using the first of the l seeds 620 to produce a l-level parent password.

For example, if user u needs access to a device one level below the highest security device D in the device hierarchy, e.g., in the hierarchy 300, we modify 700 the password 710 one time using first seed of the seeds 620. If user u needs access to a device three levels below the highest security device D, we modify 700 the password 710 three times using first three seeds of the seeds 620.

The modified password, after l modification operations, is denoted by $Y'^{[u]}$ 720. The modified password 720 is supplied to the method 100 to authorize the access to the lower-level device. Accordingly, we recover a l-level parent candidate codeword from the l-level parent password and a l-level syndrome, wherein the l-level syndrome is associated with a l-level access control device. Next, we granting the parent user access to the l-level access control device if a cryptographic hash of the l-level parent candidate codeword equals a cryptographic hash of a l-level codeword associated with the l-level access control device.

Revocation of Passwords

It may be necessary to revoke the passwords assigned to users. For conventional password systems based on cryptographic hashes, revocation is performed simply by deleting the hash of the password. For the system described herein, this procedure is accomplished by including a "blacklist" 680 of invalid passwords on each access control device and updating the blacklist whenever it is necessary to revoke one or more passwords on that device. While new users are enrolled without updating the access control device, revocation of any password does necessitate an update of the blacklist.

For security against attackers who gain access to the blacklist, we require write access to the device using a system password, which is retained only by the system administrator. This system password is implemented using conventional cryptographic hashes, or by the hierarchical access control scheme described herein. The process of revocation is performed prior to authenticating any user, i.e., the access control method first checks if the input password belongs to the blacklist. If the input password is found on the blacklist, then the remainder of the method is disabled and access is denied.

Effect of the Invention

The embodiments of the invention generate passwords for an arbitrary hierarchy of users, using a combination of error correction coding and cryptographic hashes. The method has multiple advantages over traditional authentication schemes that are based solely on cryptographic hashes. These include easy enrollment of multiple new users without updating the access control devices and dramatically reduced storage requirements on the access control devices.

The method can be used for a number of access control applications. For example, access control to a software database in large companies or banks via user accounts with different privileges; access control to physical locations of an industrial plant via smart-card readers; providing hierarchical access to selected portions of a building for security purposes; providing keys with software, which enable licensed users to access only a permissible subset of toolboxes; providing keys with video or computer games, which enable licensed users to access only a permissible subset of game levels.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for managing a hierarchy of passwords, comprising the steps of:
   acquiring a codeword;
   modifying the codeword randomly to produce a modified codeword;
   selecting the modified codeword as a password if the modified codeword is recoverable; and otherwise repeating the modifying and selecting;
   assigning the password to a user;
   determining a syndrome of the codeword;
   storing a cryptographic hash of the codeword and the syndrome at an access control device;
   associating a second user with the user;
   determining the codeword based on the password and the syndrome;
   modifying the codeword randomly with a first probability to produce a second modified codeword;
   determining a second syndrome of the second modified codeword;
   storing the second syndrome and a cryptographic hash of the second modified codeword at a second access control device;
   modifying the second modified codeword randomly with a second probability to produce a second password; and
   assigning the second password to the second user, wherein steps of the method are performed by a processor.

2. The method of claim 1, further comprising:
   storing the password at a use device.

3. The method of claim 1, wherein the modified codeword is recoverable if a result of an execution of an error correction function, having as an input the modified codeword and the syndrome, equals the codeword.

4. The method of claim 1, further comprising:
   recovering a candidate codeword from the password and the syndrome; and
   granting the user access to the access control device if a cryptographic hash of the candidate codeword equals the cryptographic hash of the codeword.

5. The method of claim 1, further comprising:
   storing the second password at a second user device.

6. The method of claim 1, further comprising:
   assigning to the user a digital signature.

7. The method of claim 6, further comprising:
   granting the user access to the access control device if the digital signature is consistent with the password.

8. The method of claim 1, further comprising:
   recovering a second candidate codeword from the second password and the second syndrome; and
   granting the user access to the second access control device if a cryptographic hash of the second candidate codeword equals the cryptographic hash of the second modified codeword.

9. The method of claim 1, further comprising:
   assigning a seed for a random number generator for the modifying the codeword randomly, and
   assigning a second seed for the random number generator for the modifying the second modified codeword randomly.

10. The method of claim 1, further comprising:
    modifying the password using a seed for a random number generator to produce a modified password;
    recovering a candidate codeword from the modified password and the syndrome; and
    granting the user access to the second access control device if a cryptographic hash of the candidate codeword equals the cryptographic hash of the second modified codeword.

11. The method of claim 1, further comprising:
    assigning a set of seeds to the user, wherein the set of seeds is suitable for modifying the codeword to produce a hierarchy of passwords to enable the user to access a hierarchy of access control devices.

12. The method of claim 11, further comprising:
    modifying the password l times, using first l seeds of the set of seeds to produce a l-level password;
    recovering a l-level candidate codeword from the l-level password and a l-level syndrome, wherein the l-level syndrome is associated with a l-level access control device; and
    granting the user access to the l-level access control device if a cryptographic hash of the l-level candidate codeword equals a cryptographic hash of a l-level codeword associated with the l-level access control device.

13. The method of claim 1, further comprising:
    associating a blacklist of passwords with the access control device, wherein each password in the blacklist is denied access to the access control device.

* * * * *